(12) United States Patent
D'Alessio

(10) Patent No.: US 6,896,838 B2
(45) Date of Patent: May 24, 2005

(54) HALOGENATED POLYMERIC CONTAINERS FOR 1, 1-DISUBSTITUTED MONOMER COMPOSITIONS

(75) Inventor: Keith R. D'Alessio, Cary, NC (US)

(73) Assignee: Closure Medical Corporation, Raleigh, NC (US)

( * ) Notice: Subject to any disclaimer, the term of this patent is extended or adjusted under 35 U.S.C. 154(b) by 429 days.

(21) Appl. No.: 09/989,387

(22) Filed: Nov. 21, 2001

(65) Prior Publication Data

US 2003/0096069 A1 May 22, 2003

(51) Int. Cl.[7] .......................... B29C 49/46; B65D 81/24
(52) U.S. Cl. .......................... 264/454; 264/456; 264/83; 264/524; 264/525; 428/36.9; 428/36.91; 206/223; 206/524.1; 206/524.4
(58) Field of Search .................................. 264/524, 525, 264/454, 456, 83; 428/36.9, 36.91; 206/223, 524.1, 524.4

(56) References Cited

U.S. PATENT DOCUMENTS

| | | |
|---|---|---|
| 2,357,833 A | 9/1944 | Kropscott et al. |
| 2,811,468 A | 10/1957 | Joffre |
| 3,516,957 A | 6/1970 | Gray, Jr. et al. |
| 3,523,628 A | 8/1970 | Colvin et al. |
| 3,524,537 A | 8/1970 | Winter |
| 3,527,841 A | 9/1970 | Wicker, Jr. et al. |
| 3,655,480 A | 4/1972 | Young |
| 3,722,599 A | 3/1973 | Robertson et al. |
| 3,862,284 A | 1/1975 | Dixon et al. |
| 3,940,362 A | 2/1976 | Overhults |
| 3,995,641 A | 12/1976 | Kronenthal et al. |
| 4,199,915 A | 4/1980 | Levine |
| 4,291,131 A | 9/1981 | McIntire et al. |
| 4,336,015 A | 6/1982 | Rainville |
| 4,394,333 A | 7/1983 | Fukushima et al. |
| 4,396,567 A | 8/1983 | Rainville |
| 4,497,856 A | 2/1985 | Iwasawa et al. |
| 4,617,077 A | 10/1986 | Giese et al. |
| 4,685,591 A | 8/1987 | Schaefer et al. |
| 4,698,247 A | 10/1987 | Murray et al. |
| 4,701,290 A | 10/1987 | Eschwey et al. |
| 4,724,177 A | 2/1988 | Russo |
| 4,731,268 A | 3/1988 | Murray, Jr. et al. |
| 4,752,428 A | 6/1988 | Williams et al. |

(Continued)

FOREIGN PATENT DOCUMENTS

| | | |
|---|---|---|
| DE | 39 33 874 | 4/1991 |
| DE | 41 09 105 | 9/1992 |
| DE | 43 20 388 | 12/1994 |
| EP | 0 170 608 | 2/1986 |
| EP | 0 210 052 | 1/1987 |
| EP | 0 341 533 | 11/1989 |
| EP | 0 628 488 | 12/1994 |
| EP | 0 857 658 A1 | 8/1998 |
| EP | 1 026 092 | 8/2000 |
| FR | 2 637 576 | 4/1990 |
| GB | 2 277 476 | 2/1994 |
| JP | 58-180571 | 10/1983 |
| JP | 60-72945 | 4/1985 |
| JP | 64-20206 | 1/1989 |
| JP | 3-162254 | 7/1991 |
| JP | 10-16992 | 1/1998 |
| JP | 11-49195 | 2/1999 |
| JP | 11-49198 | 2/1999 |
| JP | 2000-281143 | 10/2000 |
| WO | WO 00/26284 | 5/2000 |
| WO | WO 02/20069 A2 | 3/2002 |

*Primary Examiner*—Suzanne E. McDowell
(74) *Attorney, Agent, or Firm*—Hutchison & Mason PLLC

(57) ABSTRACT

A container made without employing a mold release agent, comprised of halogenated polymeric material provides an extended shelf-life for 1,1-disubstituted ethylene adhesive monomer compositions.

58 Claims, 4 Drawing Sheets

VISCOSITY v. TIME
Non Sterile 2-Octyl Cyanoacrylate at Elevated Temperatures

U.S. PATENT DOCUMENTS

| | | |
|---|---|---|
| 4,764,405 A | 8/1988 | Bauman et al. |
| 4,777,085 A | 10/1988 | Murray, Jr. et al. |
| 4,818,325 A | 4/1989 | Hiraiwa et al. |
| 4,830,810 A | 5/1989 | Ufer et al. |
| 4,869,859 A | 9/1989 | Eschwey et al. |
| 4,880,675 A | 11/1989 | Mehta |
| 4,948,641 A | 8/1990 | Shantz et al. |
| 4,948,642 A | 8/1990 | Shantz et al. |
| 5,016,784 A | 5/1991 | Batson |
| 5,073,231 A | 12/1991 | Eschwey et al. |
| 5,094,806 A | 3/1992 | Laughner |
| 5,110,392 A | 5/1992 | Ito et al. |
| 5,147,724 A | 9/1992 | Eschwey et al. |
| 5,213,734 A | 5/1993 | Masson et al. |
| 5,244,615 A | 9/1993 | Hobbs |
| 5,259,835 A | 11/1993 | Clark et al. |
| 5,292,466 A | 3/1994 | Van Bonn et al. |
| 5,328,687 A | 7/1994 | Leung et al. |
| 5,357,985 A | 10/1994 | InDelicato et al. |
| 5,401,451 A | 3/1995 | Meixner et al. |
| 5,447,667 A | 9/1995 | Masson |
| 5,514,371 A | 5/1996 | Leung et al. |
| 5,514,372 A | 5/1996 | Leung et al. |
| 5,567,371 A | 10/1996 | Karsch |
| 5,575,997 A | 11/1996 | Leung et al. |
| 5,582,834 A | 12/1996 | Leung et al. |
| 5,624,669 A | 4/1997 | Leung et al. |
| 5,658,672 A | 8/1997 | Lenke et al. |
| 5,679,287 A | 10/1997 | Mazac et al. |
| 5,681,629 A | 10/1997 | Wouters et al. |
| 5,691,016 A | 11/1997 | Hobbs |
| 5,693,283 A | 12/1997 | Fehn |
| 5,770,135 A | 6/1998 | Hobbs et al. |
| 5,827,587 A | 10/1998 | Fukushi |
| 5,855,977 A | 1/1999 | Fukushi et al. |
| 5,909,976 A | 6/1999 | Maeda |
| 5,928,611 A | 7/1999 | Leung |
| 6,066,374 A | 5/2000 | Healy et al. |
| 6,086,906 A | 7/2000 | Greff et al. |
| 6,090,397 A | 7/2000 | Lee et al. |
| 6,099,923 A | 8/2000 | Kitei |
| 6,143,352 A | 11/2000 | Clark et al. |
| 6,183,593 B1 | 2/2001 | Narang et al. ............... 156/327 |
| 6,743,858 B2 * | 6/2004 | Hickey et al. ........... 525/54.31 |
| 2002/0185396 A1 * | 12/2002 | Mainwaring et al. ....... 206/361 |
| 2003/0039781 A1 | 2/2003 | D'Alessio et al. |

\* cited by examiner

VISCOSITY v. TIME
Non Sterile 2-Octyl Cyanoacrylate at Elevated Temperatures

VISCOSITY v. TIME
Sterile 2-Octyl Cyanoacrylate at Elevated Temperatures

VISCOSITY v. TIME
Non Sterile 2-Octyl Cyanoacrylate at 40°C and 75% RH

VISCOSITY v. TIME
Sterile 2-Octyl Cyanoacrylate at 40°C and 75% RH

HALOGENATED POLYMERIC CONTAINERS FOR 1, 1-DISUBSTITUTED MONOMER COMPOSITIONS

BACKGROUND OF THE INVENTION

1. Field of Invention

This invention relates to containers made of polymeric materials that prevent premature polymerization of 1,1-disubstituted ethylene monomer compositions. In particular, this invention relates to containers made of halogenated polymeric materials that are free from mold release agents such as zinc stearate. The present invention also relates to methods of manufacturing such containers, and methods of storing polymerizable compositions in such containers to provide an extended shelf-life to the compositions.

2. Description of Related Art

Containers made of polymeric materials are well known in the art. For example, containers made of polyolefins, such as polyethylene (PE), polycarbonate (PC), polyethylene terephthalate (PET), polypropylene (PP), polystyrene, polyvinylchloride (PVC), and thermoplastic elastomer are widely used. Similarly, fluorocarbons, such as Halar® ethylene-chlorotrifluoroethylene copolymer (ECTFE) (Allied Chemical Corporation, Morristown, N.J.), Tefzel® ethylene-tetrafluoroethylene (ETFE) (E.I. duPont de Nemours and Co. Wilmington, Del.), tetrafluoroethylene (TFE), polytetrafluoroethylene (PTFE), polytetrafluoroethylene fluorinated ethylene propylene (PTFE-FEP), polytetrafluoroethylene perfluoroalkoxy (PTFE-PFA), and polyvinylidene fluoride (PVDF) are used as container materials. Further, engineered resins, such as polyamide (e.g. nylon), polyphenylene oxides, and polysulfone, are also used as container materials.

In choosing a suitable container for a particular application, its chemical and physical properties in relationship to the properties of its contents as well as its cost are among primary considerations. The polymeric material used to form the container must be essentially inert with respect to the composition to be contained during the period in which the composition is contained. That is, the polymeric material used to form the container must not substantially react with or catalyze reaction of the material contained in the container, preferably over at least an intended life (or shelf-life) of the material. The polymeric material must also provide adequate physical containment and protection during the period in which the composition is contained. For example, in biological research settings, containers are often selected for their ability to stably contain aqueous compositions intended for culturing of microorganisms. In chemical and industrial settings, containers that show high resistance to attack and/or degradation by chemicals, such as acids, bases, solvents, and organics, are widely used.

For example, U.S. Pat. Nos. 5,691,016 and 5,770,135 to Hobbs et al. disclose containers that are resistant to permeation by hydrocarbon fuels, and methods for producing these containers. The patents disclose a process for producing fluorinated plastic containers with excellent resistance to permeation by hydrocarbon fuels. The process relies on blow molding of plastic containers in the presence of fluorine-containing gases. In the process, a parison is formed from a pre-heated thermoplastic material, expanded within a closed mold by means of an inflating gas, and subjected to multiple fluorination treatment steps to effect fluorination of the interior surface of the parison. The containers so made show resistance to permeation by hydrocarbon fuels, such as motor oil.

Furthermore, it was known to form containers from materials that provide barrier properties. Fluoropolymers are known for such use. For example, U.S. Pat. No. 5,016,784 to Batson discloses an applicator syringe for containing and dispensing moisture-sensitive adhesive. The syringe comprises a generally sealed barrel containing a plunger having a non-stick polymeric seal and a hydrocarbon grease disposed between the seal and the adhesive contained in the barrel. The barrel is made of non-reactive fluoropolymer such as poly(monochlorotrifluoroethylene). The non-stick polymeric seal is also made of a fluoropolymer selected from polytetrafluoroethylene, polychlorotrifluoroethylene, fluorinated ethylene propylene polymers, and polyvinylidene fluoride. The moisture sensitive adhesive is generally described as a cyanoacrylate adhesive.

Similarly, U.S. Pat. Nos. 5,855,977 and 5,827,587, both to Fukushi et al., disclose multilayer articles comprising a non-fluorinated layer and a fluorinated layer. In U.S. Pat. No. 5,855,977, the multi-layer article comprises a non-fluorinated layer; a fluorinated layer including interpolymerized monomeric units derived from hexafluoropropylene or tetrafluoroethylene, one or more non-fluorinated olefinically unsaturated monomers, and substantially no vinylidene fluoride; and an aliphatic di- or polyamine to increase adhesion between the two layers. In U.S. Pat. No. 5,827,587, the multi-layer article includes a first layer and a second layer. The first layer is a fluoropolymer comprising interpolymerized units derived from vinylidene fluoride; the second layer is a hydrocarbon polymer comprising polyamide, polyimide, carboxyl anhydride, or imide functional polyolefin; and an aliphatic di- or polyamine to increase adhesion between the two layers. The articles of both patents are disclosed as useful for tubing and hoses suitable for use in motor vehicles, such as for fuel-tank hoses.

Adhesives can comprise either organic or inorganic compounds, or a combination of the two, and have broad utility in both industrial (including household) and medical applications. Because it is most economical for manufacturers to produce adhesives on a large scale, and for merchants to purchase adhesives in bulk quantities prior to sale to consumers, adhesives are often stored for extended periods of time between manufacture and use. Therefore, they must be stored in containers that are capable of maintaining them in a substantially unadulterated state for a reasonable amount of time in order to make their bulk manufacture and purchase economical. Reasonable storage times apply to containers holding large volumes (such as greater than one liter), which are typically purchased by industrial concerns, as well as those holding small volumes (such as one liter or less, even a few milliliters or less), which are typically purchased by medical and individual consumers.

In addition to the widespread use of adhesives in industrial applications, recently the medical profession (including veterinary medicine) has begun to use certain adhesives as replacements for, or adjuncts to, sutures and staples for closure of wounds, as biological sealants, and as wound coverings. Among the adhesives currently being used for medical purposes are adhesives formed from 1,1-disubstituted ethylene monomers, such as the α-cyanoacrylates. Typically, for medical purposes, an adhesive should have a shelf-life of at least one year and preferably at least two years; however, an increased shelf-life beyond this provides increased economic advantages to both the manufacturer and the consumer. As used herein, shelf-life refers to the amount of time the container and composition therein can be held at approximately room temperature (21–25° C.) and moisture level (about 40–60% relative humidity) without degradation of the composition and/or container occurring to the extent that the composition and container cannot be used in the manner and for the purpose for which they were intended. Thus, while some degradation to either or both of the composition and container can occur, it must not be to such an extent that the composition and/or container is no longer useable. Shelf-life can thus be limited by physical or aesthetic changes to the containers or products contained therein, by chemical reactions occurring within the composition being stored, by chemical reactions between the container and the composition being stored, by degradation of the container itself, and the like.

Because the α-cyanoacrylates have become the most widely used adhesives for medical applications, containers that can hold these adhesives for extended periods of time without loss of the expected qualities of the adhesive (adherence, cure time, biological safety, purity, etc.) are essential.

High-density polyethylene (HDPE) or aluminum tubes have become the industry standard materials for packaging and containing α-cyanoacrylate adhesive monomers. HDPE generally has a density of above about 0.94 g/cm$^3$. HDPE is the primary choice for a container material in the industry because it provides adequate containment and shelf-life for many α-cyanoacrylate monomer compositions, including methyl-, ethyl-, and butyl-cyanoacrylate monomers. These lower alkyl chain length α-cyanoacrylate adhesive monomers can be stably contained in HDPE containers for over one year without significant degradation of the monomer composition or the container.

For example, U.S. Pat. No. 4,685,591 to Schaefer et al. discloses a multilayer packaging tube suitable for holding products containing substantial fractions of cyanoacrylate-type components. The tube has a layer of high-density polyethylene positioned on the side of the tube that comes into contact with the cyanoacrylate. The high-density polyethylene preferably has a density of at least 0.950 g/cm$^3$. A primer layer of polyethylene imine is located outside of the high density polyethylene layer and acts to block migration to the outside surface of any cyanoacrylate product that passes through the high density polyethylene.

U.S. Pat. Nos. 4,777,085, 4,731,268, and 4,698,247 to Murray, Jr. et al. disclose a multiple layer packaging sheet material, and containers and packages made therefrom, that are suitable for holding products containing substantial fractions of cyanoacrylates. The multiple-layer packaging sheet material has a layer of high-density polyethylene that is in contact with the cyanoacrylate-containing product. The high-density polyethylene preferably has a density of at least 0.950 g/cm$^3$. The multiple-layer packaging sheet material also has a primer layer made of a low permeability polymer such as polyethylene imine (PEI) that impedes the migration of the cyanoacrylate product through the material.

U.S. Pat. No. 3,523,628 to Colvin et al. discloses a container to hold cyanoacrylate ester adhesives. The container has a body that is substantially impermeable to air and moisture to minimize deterioration of the contained adhesive, and has an opening formed of a thermoplastic resin characterized by a low surface free energy. The container body may be constructed of any air or vapor impermeable material, including metals, glass, or ceramics. Synthetic resins can be employed as the container material or as a coating on the internal surfaces of a container formed of some other material, provided the resin is selected to satisfy the critical requirements of the invention as regards air and vapor permeability and inertness with respect to initiation of polymerization of the cyanoacrylate monomers. Preferred thermoplastic resins are the halogenated hydrocarbon polymers, especially where the halogen is fluorine, such as polyhexafluoropropylene, polytetrafluoropropylene, polyvinyl fluoride, and polyvinylidene fluoride. Copolymers of ethylene with polymers of the type just named can also be used. The cyanoacrylates to be contained include alkyl cyanoacrylates with alkyl groups having from 1 to 16 carbon atoms. Lower alkyl groups, such as methyl, are preferred.

U.S. Pat. No. 3,524,537 to Winter discloses a hermetically sealed package comprising a poly(monochlorotrifluoroethylene) container having therein a sterile 2-cyanoacrylic ester adhesive. The adhesive is selected from alkyl 2-cyanoacrylate and fluoroalkyl 2-cyanoacrylate. Similar to the packages of Colvin, these packages are made from pre-fluorinated materials, and particularly from fluoropolymers.

Copending U.S. patent application Ser. No. 09/430,289 describes a container for storing a 1,1-disubstituted ethylene monomer composition. The container is comprised of a polymeric resin matrix including at least one post-halogenated or functionalized polymeric material. The post-halogenated or functionalized polymeric resin matrix provides a barrier layer to decrease permeation of the monomer composition and provides an increased stabilizing effect to the monomer composition to increase the shelf-life of the container and composition.

It is also generally known in the art to use containers that are free of undesirable additives that may affect the stability of a cyanoacrylate adhesive to be contained in the container. For example, JP 60-72945 discloses a polyethylene container that is free from stearic acid metallic salts, due to the effect of such salts on the viscosity of the cyanoacrylate adhesive. Similarly, JP 1-02026 discloses a container made of polypropylene that is free of additives other than phenolic antioxidants and acylic additives. JP 5810571 discloses a polyethylene container that is cleaned subsequent to manufacture to remove impurities associated with lubrication or polymerization catalysis. However, these references fail to recognize a direct effect caused by specific additives in specific product configurations.

SUMMARY OF THE INVENTION

The use and manufacture of a variety of thermoplastic containers made of various polymeric materials is well known. In molding such containers, mold release agents are generally used to facilitate release of a shaped article, such as a container, from the mold. In manufacturing processes employing various forms of extrusion, these agents are also used to facilitate the flow of plastic through extrusion orifices. Mold release agents have included, for example: stearic acid and its salts; ester type waxes, such as beeswax, carnauba wax, candelilla wax; and hydrocarbon products such as paraffin wax and paraffin oil. Zinc stearate, however, has become ubiquitous in its use as a mold release agent in the production of polymeric containers, including those containers that are used for storage of 1,1-disubstituted ethylene monomers. Mold release agents, such as zinc stearate, are used merely to aid in manufacture, but the compositions becomes part of the finished product. While mold release agents, such as zinc stearate, facilitate container manufacture, they also react with 1,1-disubstituted ethylene monomers. The result of this reaction is premature polymerization, and thus reduced shelf life.

The present inventor has discovered an unexpected interaction between mold release agents, moisture, and radiation sterilization in containers for storing 1,1-disubstituted ethylene monomers. When 1,1-disubstituted ethylene monomers are stored at room temperature and moisture conditions, in containers that are comprised of halogenated polymer that have been manufactured using a conventional mold release agent, and the containers are subjected to sterilization, the combination of container and product has an unacceptable shelf life. The present inventor has further discovered that if the above conditions are replicated, except that the container is manufactured in the absence of mold release agent, then the combination of container and product has an unexpected and exceptional shelf life.

Accordingly, the present invention provides containers (including storage vessels, dispensers, applicators, and the like) comprising polymeric materials that provide an extended shelf-life for 1,1-disubstituted ethylene monomers for both industrial and medical uses. As used herein, an "extended shelf-life" refers to a shelf-life of at least 12 months, preferably at least 18 months, more preferably at least 24 months, and even more preferably, at least 30 months. Containers of the present invention comprise a barrier layer that is highly resistant to the effects of permeation by liquids and gases (including vapors such as water vapor that acts as a polymerization initiator), as well as highly resistant to degradation by 1,1-disubstituted ethylene monomers. As used herein, degradation of the container includes, but is not limited to, chemical attack, swelling, cracking, etching, embrittlement, solvation, and the like. The containers further provide resistance to degradation of the 1,1-disubstituted ethylene monomers contained therein. As used herein, degradation of the composition includes, but is not limited to, premature polymerization (as reflected by viscosity changes) and undesirable changes in reactivity (including increases or decreases in cure time).

In particular, the present invention provides a container, preferably in combination with a 1,1-disubstituted ethylene monomer composition contained therein, wherein the container is comprised of a halogenated polymeric material that is free from mold release agents, such as zinc stearate. Halogenation of the polymer material provides a barrier to decrease permeation of components of the monomer composition and provides an increased stabilizing effect to the monomer composition, while the exclusion of mold release agents, such as zinc stearate, eliminates the unfavorable premature polymerization caused by the interaction between the mold release agent and the 1,1-disubstituted ethylene monomer composition. Use of the resulting container, thus, increases the shelf-life of the container and composition.

The present invention further provides such a container, and methods for manufacturing the container and methods for storing polymerizable adhesive compositions in the container. Such methods provide for increased shelf-life of the product.

Furthermore, the present inventor has unexpectedly found that the containers of the present invention exhibit superior results when the combination of container and material is exposed to sterilizing radiation, such as electron beam irradiation. Previously, the inventor has observed that halogenated containers, particularly post-halogenated containers, provide increased shelf-life to a composition. However, such containers exhibited inferior performance when subjected to sterilizing radiation, and resulted in excessive premature polymerization of cyanoacrylate compositions contained in the containers. Likewise, the present inventor has observed that containers, particularly HDPE containers manufactured without a zinc stearate processing aid, also exhibited inferior performance when subjected to sterilizing radiation, and resulted in excessive premature polymerization. However, the present inventor has unexpectedly discovered that when these concepts are combined, i.e., when a halogenated container, particularly a post-halogenated container, manufactured without a zinc stearate processing aid is used for storing a polymerizable adhesive composition, the result is an unexpected superior performance of the container in providing an extended shelf-life to the product. Under moist (humid) conditions, the extended shelf-life is exhibited both in the absence of sterilizing radiation, as well as where sterilizing radiation is used to sterilize the container and contents. Further, in products exposed to sterilizing radiation, these unexpected results are observed over a range of conditions, from a dry atmosphere to the moist (humid) atmosphere described above.

These and other features and advantages of this invention are described in, or are apparent from, the following detailed description of various exemplary embodiments of the systems and methods according to this invention.

BRIEF DESCRIPTION OF THE FIGURES

Various exemplary embodiments of this invention will be described in detail, with reference to the following figures, wherein.

DETAILED DESCRIPTION OF EXEMPLARY EMBODIMENTS

Figure 1:
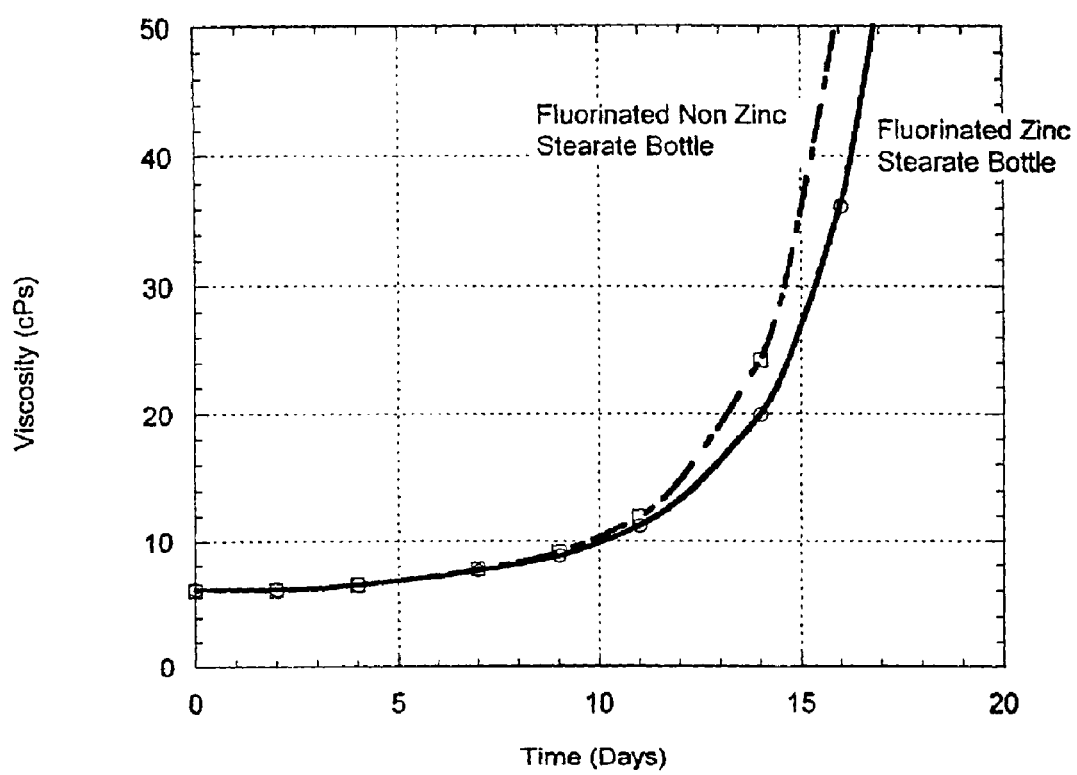
FIG. 1 is a graph showing the viscosity of non-sterilized formulations of 1,1-disubstituted ethylene monomer as a function of time for zinc stearate-containing fluorinated high density polyethylene bottles and zinc stearate-free fluorinated high density polyethylene bottles at elevated temperatures in a dry environment.

Monomers of 1,1-disubstituted ethylene adhesives such as α-cyanoacrylates are highly reactive, polymerizing in the presence of minute quantities of initiators, even initiators such as water vapor present in air. Therefore, in order to provide a stable adhesive monomer composition in a container with an extended shelf-life, it is desirable and beneficial to provide a container that is impermeable, or at least less permeable, to water, including water vapor. Otherwise, as water vapor enters the container, it acts as a polymerization initiator for the monomer, resulting in unwanted, premature polymerization of the adhesive monomers within the container.

Furthermore, because α-cyanoacrylate monomers are of relatively low molecular weight, they generally exist in both a liquid phase and a vapor phase when contained in a fixed volume at approximately room temperature and under standard pressure. It has been found that these monomers show a high degree of transmission into and through polymeric materials commonly used in containers. When these α-cyanoacrylate monomers pass trough the container walls and reach the exterior surface of the container, they can polymerize and/or crystallize, generally forming a white, powdery material on the exterior surface of the container. This polymerization and/or crystallization is often referred to as "blooming" and is an indicator of failure of the container material.

In addition, monomers that enter into the polymeric matrix of the container can polymerize within the matrix before reaching the other side of the matrix and cause the container to fail, such as through swelling, cracking, splitting, or otherwise weakening of the polymeric matrix. Furthermore, monomers can interact with the polymer matrix, similarly resulting in failure of the container material.

Producing containers having a halogenated polymeric barrier layer on at least the monomer-contacting surfaces of the container provides an unexpectedly superior shelf-life, especially for 1,1-disubstituted ethylene monomers, including, but not limited to esters of cyanoacrylic acids such as higher alkyl chain length alkyl α-cyanoacrylate adhesive monomer compositions.

Given the highly reactive nature of 1,1-disubstituted ethylene monomer compositions, it is also preferable that the containers that hold 1,1-disubstituted ethylene monomer compositions do not, themselves, react with the compositions. If the surface of the container, or any component of the surface, that contacts the 1,1-disubstituted ethylene monomer composition acts as an initiator, even an impermeable container will not prevent premature, unwanted polymerization of the composition.

By virtue of widely used manufacturing techniques, polymeric containers, including those containers used to hold 1,1-disubstituted ethylene monomer compositions, are produced by methods that employ mold release agents. Mold release agents increase efficiency in the manufacture of polymeric containers, but as a result of their use, the mold release agents are incorporated into the finally produced polymeric containers. Mold release agents, and in particular zinc stearate, can act as initiators with regard to 1,1-disubstituted ethylene monomer compositions. As a result, when a container that holds a 1,1-disubstituted ethylene monomer composition, or a portion of a container that contacts the composition, is manufactured by widely used methods, the composition will be in contact with an initiator, just by being placed in its container. Contact with this initiator causes polymerization, which in turn reduces the shelf life of the product. This contact can result either by the residual mold release agent being present on the surface of the container, or within the container matrix. When the mold release agent is present on the surface of the container, premature polymerization can occur almost immediately. When the mold release agent is present within the container matrix, premature polymerization can occur over a longer period of time.

Various forms of sterilization can have an adverse effect on a polymeric container. Among the various uses for 1,1-disubstituted ethylene monomer compositions are medical applications. Many of the medical applications require that the 1,1-disubstituted ethylene monomer composition be sterile. Thus, the 1,1-disubstituted ethylene monomer compositions must be sterilized before use; this often occurs while the composition is in a polymeric container following manufacture and packaging of the composition. Sterilization of the monomer composition and/or its packaging can be accomplished by techniques known to the skilled artisan, and is preferably accomplished by methods including, but not limited to, chemical, physical, and/or irradiation methods. These processes of sterilization can, themselves, reduce the shelf life of 1,1-disubstituted ethylene monomer compositions by, for example, degrading the containers that carry the compositions, and/or by initiating chemical reactions among the different chemical species that are present.

The inventor has discovered that known, positive results achieved using containers comprising halogenated polymeric materials can be enhanced if mold release agents, such as zinc stearate, are excluded from manufacture of the container. The combined effects of halogenation and exclusion of mold release agents such as zinc stearate result in unexpectedly prolonged shelf life. Though this property may not be readily evident under commonly used, dry, high-temperature testing conditions, the unexpected positive results can be observed under conditions of higher relative humidity that more resemble ambient conditions.

Thus, a superior polymeric container for 1,1-disubstituted ethylene monomer compositions can be achieved by improving impermeability of the container, and by eliminating mold release agents that act as initiators to the compositions. Thus, the present invention provides a container that is essentially impermeable, or at least less permeable, to water vapor and to low molecular weight monomers, including 1,1-disubstituted ethylene monomers such as α-cyanoacrylate monomers, to hold these adhesives. The container is also free from, or essentially free from mold release agents, such as zinc stearate, thus reducing the presence of unwanted initiators in or in contact with the 1,1-disubstituted ethylene monomer compositions contained therein. In addition, in various exemplary embodiments where the adhesive must be sterile, the container and composition in the container exhibit unexpectedly reduced effects from various forms of sterilization.

According to the present invention, the container is free from, or is at least substantially free from, mold release agent. As used herein, "mold release agent" refers to a class of compounds that are conventionally used in the art of molding polymeric materials, which compounds are generally added to the raw polymeric material (i.e., are internal to the material, rather than being coated on the mold parts) merely to help processability of the material and to help effectuate release of the molded container from the mold. Mold release agents thus typically include, for example, stearic acid or behenic acid and their salts such as calcium stearate, zinc stearate and the like; ester type waxes, such as beeswax, carnauba wax, and candelilla wax; and hydrocarbon products such as paraffin wax and paraffin oil. Preferably, since zinc stearate is widely used as an internal mold release agent for molding polymeric materials, it is preferred in embodiments of the present invention that the molding process does not use such zinc stearate, and thus that the resultant molded container is free from zinc stearate.

As used herein, the terms "halogenated polymer" refers to any polymer, at least a surface of which is halogenated by any suitable method. Halogenated polymers include "halocarbon polymers" where the polymer is initially formed from halogen-containing monomeric units, "post-halogenated polymers", and polymeric materials produced by combinations of the above methods. "Post-halogenated polymers" are any polymers, at least a surface of which is halogenated, such as fluorinated, subsequent to formation of the polymer material. Thus, for example, the term refers to polymeric materials wherein at least a surface of the polymer material is subsequently halogenated by suitable treatment methods to introduce halogen species into at least the surface layer of the polymeric material. With regard to any of the above polymers, any of the halogens may be used, including fluorine, chlorine, bromine, iodine, and astatine.

As used herein, "higher alkyl chain length" α-cyanoacrylate monomers includes α-cyanoacrylate monomers with alkyl chains of at least six carbons, e.g., those having 6, 7, 8, 9, 10, 11, 12, 13, 14, 15, or more carbons in the alkyl chain. As used herein, "lower alkyl chain length" α-cyanoacrylate monomers includes α-cyanoacrylate monomers with alkyl chains of five or fewer carbons, i.e. those having 1, 2, 3, 4, or 5 carbons in the alkyl chain.

The present invention provides a container that is highly impermeable to 1,1-disubstituted ethylene monomer liquids and gases (including vapors). That is, the barrier layer included in the containers according to the present invention provides a container that is less permeable as compared to containers not including the barrier layer, and less likely to react with the compositions in the container. In embodiments, the container comprises a polymeric matrix that is selected in conjunction with the material to be contained such that the container is essentially impermeable, or at least much less permeable, to at least the 1,1-disubstituted ethylene monomer material contained, and that is free from zinc stearate. The container comprises any suitable halogenated polymeric material that is free from zinc stearate, including, but not limited to, polyolefins, fluorinated hydrocarbons (fluorocarbons), and engineered resins. The container can comprise homopolymers, copolymers, higher order polymers, or mixtures thereof, and can comprise one species of polymeric material or mixtures of multiple species of polymeric material.

The barrier layer of embodiments of the invention is free from mold release agents such as zinc stearate, and comprises at least one post-halogenated polymer that is substantially inert with respect to the 1,1-disubstituted ethylene monomer to be contained, and thereby provides the containers with liquid and vapor (gas) impermeability characteristics. Halogenated polymeric materials increase the liquid and vapor impermeability of the containers to the extent that 1,1-disubstituted ethylene monomer compositions can be contained for extended periods of time without significant degradation of the monomer or the container. The improvement in shelf-life for containers holding certain 1,1-disubstituted ethylene monomers, including, but not limited to higher alkyl chain length α-cyanoacrylate monomer compositions, or monomer compositions including no or only small amounts of stabilizers, has not been realized until now. This is, in part, due to the fact that lower alkyl chain length α-cyanoacrylate monomers, many including stabilizers, comprise the vast majority of 1,1-disubstituted ethylene monomer adhesive compositions being marketed, and do not seem to cause shelf-life problems for non-fluorinated polymeric containers of the same magnitude as other 1,1-disubstituted ethylene monomers.

The halogenated, mold release agent-free polymeric materials on monomer-contacting surfaces of the container improve the barrier properties of the container with respect not only to 1,1-disubstituted ethylene adhesive monomers contained within the container, but to liquids and vapors (gases) present outside of the container as well. Thus, in embodiments of the present invention, the container is preferably impermeable, or much less permeable, to both the material inside the container as well as materials outside the container. This increase in barrier properties extends the shelf-life of the container and adhesive. This increase in barrier properties is especially important in view of the property of increased swelling of polymeric resin-containers holding higher allyl chain length α-cyanoacrylate monomers (as compared to lower alkyl chain length α-cyanoacrylate monomers) or non-stabilized or minimally-stabilized α-cyanoacrylate monomer compositions.

The vapor permeability of a container is dependent, to a large extent, on the polymer used to manufacture the container and the components within the container. For example, the vapor permeability of a container comprising HDPE is generally lower than that of a container comprising LLDPE when an α-cyanoacrylate adhesive monomer is contained within the container. Similarly, the vapor permeability of a container comprising LLDPE is generally lower than that of a container comprising low density polyethylene (LDPE). However, the present inventor has discovered that even HDPE does not always provide sufficient monomer liquid and gas impermeability to enable an extended shelf-life for the adhesive product. Thus, the present containers comprising a halogenated, mold release agent-free barrier layer have been developed. The present containers have wide applicability and can be used to contain many different 1,1-disubstituted ethylene monomer compositions, including, but not limited to, 1,1-disubstituted ethylene monomer compositions that do not substantially comprise alkyl α-cyanoacrylate monomers having an alkyl chain of less than 6 carbons or compositions that do not include higher amounts of stabilizers.

The present invention permits a reduction in the vapor permeability of containers comprising a wide variety of polymeric materials, and is not limited to reduction in vapor permeability of containers comprising polymeric materials with initially high vapor permeabilities only. Thus, this aspect of the present invention is applicable to containers made of, for example, HDPE, LLDPE, LDPE, and other polymers.

In embodiments, the containers of the present invention comprise a halogenated, mold release agent-free polymer, such as a post-fluorinated polymer, on at least an internal surface of the container, on each surface that is to contact a liquid or vapor composition comprising a 1,1-disubstituted ethylene monomer, or even on all surfaces of the container.

Containers of the present invention provide extended shelf-lives for 1,1-disubstituted ethylene monomer compositions, such as α-cyanoacrylate monomer compositions comprising α-cyanoacrylate monomers with lower and/or higher alkyl chain lengths. The containers of the present invention also provide extended shelf-lives for such monomer compositions that include no stabilizers, or only a sufficient amount of stabilizer to prevent premature polymerization of the monomeric material inside the lumen of the container. The containers can contain these monomer compositions for extended periods of time without showing visual evidence of container failure, such as swelling, cracking, or blooming.

An indication of premature polymerization in 1,1-disubstituted ethylene monomer compositions, such as α-cyanoacrylate monomer compositions in particular, is an increase in viscosity of the composition over time. That is, as the composition polymerizes, the viscosity of the composition increases. If the viscosity becomes too high, i.e., too much premature polymerization has occurred, the composition becomes unsuitable for its intended use or becomes very difficult to apply. Thus, while some polymerization or thickening of the composition may occur, such as can be measured by changes in viscosity of the composition, such change is not so extensive as to destroy or significantly impair the usefulness of the composition. However, the present invention, by providing a barrier layer in the containers, decreases or prevents the premature polymerization of the composition, and thereby provides better control over the viscosity of the composition.

Suitable halogenated, mold release agent-free polymer materials for use in the present invention include any such post-halogenated polymeric materials, amenable to halogenation processing, that are suitable for fabrication of containers that are subsequently or concurrently halogenated by at least one known halogenation method. Such containers are disclosed in copending U.S. patent application Ser. No. 09/430,289, the disclosure of which is hereby incorporated by reference in its entirety. The halogenation process must not render the polymeric material unusable as a container material. Polymeric materials suitable for subsequent halogenation processing include, but are not limited to, polyolefins and engineered resins.

Suitable polyolefins include, but are not limited to, polyethylene (PE), such as high-density polyethylene (HDPE), medium-density polyethylene; low-density polyethylene (LDPE), cross-linked high-density polyethylene (XLPE), linear low-density polyethylene (LLDPE), ultra low-density polyethylene, and very low-density polyethylene; polycarbonate (PC); polypropylene (PP); polypropylene copolymer (PPCO); polyallomer (PA); polymethylpentene (PMP or TPX); polyketone (PK); polyethylene terephthalates (PET), including polyethylene terephthalate G copolymer (PETG) and oriented PET; polystyrene (PS); polyvinylchloride (PVC); naphthalate; polybutylene terephthalate; thermoplastic elastomer (TPE); mixtures thereof; and the like. Exemplary densities of the above polyethylenes are as follows: LDPE —0.910–0.925 g/cm$^3$; medium-density polyethylene —0.926–0.940 g/cm$^3$; HDPE —0.941–0.965 g/cm$^3$. Other densities can be determined by the ordinary artisan by referencing ASTM D 1248 (1989).

Containers of the present invention can comprise engineered resins. Exemplary engineered resins include, but are not limited to, polyamide, such as nylon; polyphenylene oxides (PPO); polysulfone (PSF); mixtures thereof; and the like.

In embodiments, the containers of the present invention can comprise mixtures of the above polyolefins, and/or engineered resins if the resulting mixture is halogenated, or amenable to halogenation treatment.

Preferred containers of the present invention comprise zinc stearate-free, post-halogenated polyethylene. In embodiments, the preferred polymer comprises LDPE, LLDPE, HDPE, XLPE (cross-linked polyethylene) or PET, more preferably LDPE, LLDPE, HDPE, or PET, and most preferably, LLDPE, HDPE, or PET.

The container can be constructed in any shape and size, so long as zinc stearate is not used in manufacture. The dimensional characteristics are limited only by the intended use and practicality considerations. In embodiments, the container can hold greater than 55 gallons (U.S.). In other embodiments, the container can hold up to approximately 55 gallons, preferably 55 gallons, one quart, or one liter. In embodiments, the container holds no more than one liter, preferably up to approximately 10 milliliters (ml.). In some preferred embodiments, the container can hold up to approximately 1.0 ml., 1.5 ml., 2.0 ml or 3.0 ml. The minimum volume for the container is limited only by practical considerations.

The container of the present invention can be constructed as a single piece, or may comprise multiple elements, such as a bottle, a cap, and a dispensing element (e.g. controlled dropper, syringe, bulb, swab, and the like). In some embodiments, each element of the container comprises the same polymeric material. In other embodiments, each element comprises a different polymeric material. In yet other embodiments, multiple elements comprise one polymeric material while other elements comprise (an)other polymeric material(s). Each element of a multi-element container can, but does not necessarily, comprise a halogenated barrier layer comprising one or more post-halogenated polymers. In exemplary embodiments, each element of the container that contacts the material to be contained, either in the liquid or vapor phase, comprises at least one surface that comprises a post-halogenated, zinc stearate-free polymer.

In embodiments where the container comprises multiple elements, each element can, but does not need to, comprise a polymeric material. However, for each container, at least one element that contacts the contained material should be a halogenated polymeric material, and the container, or at least the portion that contacts the contained materials, must be free from zinc stearate. For example, in addition to, or instead of, comprising a polymeric material, elements of the container may be composed of materials such as metal, glass, ceramics, and the like. Likewise, as long as at least one element is formed of the halogenated polymeric material, other elements of the container can be formed from non-post-halogenated polymers. In general, the only limitation on the materials used to fabricate the container and its elements is that the surface of the container material must be sufficiently compatible with the composition to be contained that undesirable effects on the composition and/or the container do not prevail during contact of the composition with the container or its elements, and the materials must not introduce zinc stearate to the combination of container and composition. In exemplary embodiments where the container material comprises a polymeric material, at least the inner surface comprises a halogenated polymer according to the invention.

The halogenated surface, or barrier layer, may be integral with the container matrix or may be present as a laminate layer on the container matrix. In embodiments where the halogenated surface or barrier layer is formed as a laminate of a post-halogenated polymer over another material, the other material can be any other material suitable for forming the container, but is preferably also a polymeric material. Where the other material is a polymeric material, it can be any suitable polymeric material, including any of the above-described polyolefins, halogenated hydrocarbons and/or engineered resins. The halogenated surface or barrier layer is then preferably formed by halogenating an unhalogenated polymeric material, as described below. In embodiments where the halogenated barrier layer is integral with the container matrix, the barrier layer may be formed during a halogenation process conducted upon a suitable polymeric material. Any of the various halogenation techniques known to the skilled artisan can be used. Included among these techniques are those disclosed in U.S. Pat. Nos. 5,693,283, 5,691,016, and 5,770,135, the entire disclosures of which are hereby incorporated by reference in their entirety.

The halogenation treatment may provide halogenation of the polymer material substantially only on a surface of the polymer material. That is, the halogen atoms are deposited into the polymer matrix primarily at the surface, leaving at least a portion (i.e., an interior layer) of the thickness of the polymer matrix substantially unhalogenated. Thus, the treatment halogenates the polymer matrix such that a majority of the halogen atoms are located on the exposed surface of the polymer material, and fewer halogen atoms are present as the depth into the polymer matrix increases.

In exemplary embodiments, the method comprises manufacturing a polymeric container without the use of mold release agents, such as zinc stearate, halogenating the polymeric material on at least the internal surface of the container (either prior to, during, or after molding the polymeric material into the form of the container), dispensing a 1,1-disubstituted ethylene monomer composition into the container, and, optionally, sealing the container. During such a process, at least one surface of the container (or element thereof) is exposed to a fluorine-containing source, such as liquid, gas, or plasma. Briefly, during fluorination, the fluorine attacks accessible (surface) polymer molecules and replaces protons attached to the polymer backbone. When halogenation occurs during molding, it can be accomplished by using a suitable halogen source, such as a fluorine-containing gas or a chlorine-containing gas, to blow mold the container. Included among the blow molding techniques are injection blow molding and extrusion blow molding, among others. The 1,1-disubstituted ethylene composition is then dispensed into the formed container.

In embodiments, the method further comprises sterilizing the 1,1-disubstituted ethylene monomer composition, either prior to, or subsequent to, dispensing into the container. Sterilization of the monomer composition and/or its packaging can be accomplished by techniques known to the skilled artisan, and is preferably accomplished by methods including, but not limited to, chemical, physical, and/or irradiation methods. Examples of chemical methods include, but are not limited to, exposure to ethylene oxide or hydrogen peroxide vapor. Examples of physical methods include, but are not limited to, sterilization by heat (dry or moist) or retort canning. Examples of irradiation methods include, but are not limited to, gamma irradiation, electron beam irradiation, and microwave irradiation. A preferred method is electron beam irradiation.

In evaluating containers for storing 1,1-disubstituted ethylene monomers, the present inventor determined that halogenated polymeric containers that are manufactured with a mold release agent such as zinc stearate appear to be suitable containers when stored at elevated temperatures under dry conditions. This determination was made by testing under conditions typically used by skilled artisans to test the shelf life of such containers. The test results indicated that halogenated polymeric containers that are manufactured with a mold release agent have a suitable shelf both when exposed to sterilizing radiation and under non-sterile conditions. Surprisingly, however, the present inventor also discovered that the same containers have an unacceptable shelf life when stored under slightly elevated temperature and moist (humid) conditions.

While examining alternative containers, the present inventor determined that when 1,1-disubstituted ethylene monomers are stored at elevated temperatures under dry conditions in halogenated polymeric containers that are manufactured without a mold release agent such as zinc stearate, and that have not been subjected to electron beam radiation, the shelf life of the resulting product is similar to or inferior to containers manufactured with zinc stearate. Under these temperature and moisture conditions, containers manufactured without a mold release agent that have been exposed to sterilizing radiation have an acceptable shelf life, in the same manner as polymeric containers manufactured with zinc stearate tested under the same conditions.

However, when the present inventor continued to examine the alternative, zinc stearate-free containers under slightly elevated temperature and moist (humid) conditions, he remarkably discovered that the resulting product has a vastly superior shelf life when compared to containers manufactured with a conventional mold release agent and kept under the same temperature and moisture conditions. This extraordinary result was obtained both in containers that were subjected to sterilizing radiation, and in containers that were not.

Thus, the present invention provides a method of manufacturing a container that provides an extended shelf-life for 1,1-disubstituted ethylene monomer compositions, as well as a container holding a 1,1-disubstituted ethylene monomer composition. The container can contain the 1,1-disubstituted ethylene monomer composition for extended periods of time before visual indications of failure, such as swelling of the container, are detectable or premature polymerization renders the composition useless.

Although not limited to any particular theory, it is believed that the fluorination process chemically modifies the polymers present at least at the internal surface of the polymeric matrix to form a thin layer of fluorinated polymer on the surface of the matrix.

Although the above description focuses on fluorination of the polymeric materials, other halogenation methods, including bromination, iodination, astatination and preferably chlorination, can advantageously be used according to the claimed invention. Chlorination and other halogenation processes are also generally known in the art, and can readily be adapted to provide halogenated layers for containers according to the present invention. It is believed that the chlorinated layers also provide the desired barrier properties to reduce permeation of the monomer through the container, and also to reduce the permeation of materials, such as water vapor, into the container from the outside.

The method described above results in a container that provides an extended shelf-life for 1,1-disubstituted ethylene monomers. Thus, the present invention also provides a method of storing a 1,1-disubstituted monomer composition for extended periods of time without failure of the container or monomer composition. In embodiments, the period of time the container can contain the monomer composition is at least one year. Preferably, the length of time is at least 18 months, more preferably at least 24 months or 30 months.

In embodiments of the present invention, the container is made and fluorinated in the absence of a mold release agent such as zinc stearate, and filled with a 1,1-disubstituted ethylene monomer in a continuous process that can be fully automated. This fully automated process can be performed aseptically, allowing the manufacture of a sterile, sealed container of adhesive that can be used in both industrial and medical applications.

The monomer composition is preferably a monomeric (including prepolymeric) 1,1-disubstituted ethylene monomer adhesive composition. In embodiments, the monomer is an α-cyanoacrylate. Preferred monomer compositions of the present invention, and polymers formed therefrom, are useful as tissue adhesives, sealants for preventing bleeding or for covering open wounds, and in other absorbable and non-absorbable biomedical applications. They find uses in, for example, apposing surgically incised or traumatically lacerated tissues; retarding blood flow from wounds; drug delivery; dressing burns; dressing skin or other superficial or surface wounds (such as abrasions, chaffed or raw skin, and/or stomatitis); hernia repair; meniscus repair, and aiding repair and regrowth of living tissue. Other preferred monomer compositions of the present invention, and polymers formed therefrom, are useful in industrial and home applications, for example in bonding rubbers, plastics, wood, composites, fabrics, and other natural and synthetic materials.

Monomers that may be used in this invention are readily polymerizable, e.g. anionically polymerizable or free radical polymerizable, or polymerizable by zwitterions or ion pairs to form polymers. Such monomers include those that form polymers, that may, but do not need to, biodegrade. Such monomers, and compositions comprising such monomers, are disclosed in, for example, U.S. Pat. No. 5,328,687 to Leung, et al., and co-pending U.S. patent application Ser. No. 09/099,457, both of which are hereby incorporated in their entirety by reference.

Useful adhesive materials are 1,1-disubstituted ethylene monomers including, but not limited to, monomers of the formula:

$$HRC=CXY \qquad (I)$$

wherein X and Y are each strong electron withdrawing groups, and R is H, —CH=CH$_2$ or, provided that X and Y are both cyano groups, a C$_1$–C$_4$ alkyl group. Examples of monomers within the scope of formula (1) include α-cyanoacrylates, such as ethyl, butyl and/or 2-octyl cyanoacrylate, vinylidene cyanides, C$_1$–C$_4$ alkyl homologues of vinylidene cyanides, dialkyl methylene malonates, acylacrylonitriles, vinyl sulfinates and vinyl sulfonates of the formula CH$_2$=CX'Y' wherein X' is —SO$_2$R' or —SO$_3$R' and Y is —CN, —COOR', —COCH$_3$, —SO$_2$R' or —SO$_3$R', and R' is H or hydrocarbyl.

In other embodiments, a mixture or blend of two or more monomer species may also be used. For example, the mixture or blend can be of different monomer species having different absorption or degradation rates or other properties, to provide a desired property to the adhesive composition. Such mixtures and blends of monomers are disclosed in, for example, U.S. patent applications No. 09/630,437 filed Aug. 2, 2000, and Ser. No. 09/919,877 filed Aug. 2, 2001, the entire disclosures of which are incorporated herein by reference.

Furthermore, the adhesive composition can further include various additives as are known in the art, including but not limited to flavorants, preservatives, plasticizing agents, stabilizing agents, formaldehyde concentration reducing agents, pH modifiers, thickening agents, cross-linking agents, fibrous reinforcement agents, colorants, and the like.

Suitable compositions, methods of making such compositions, and methods for incorporating such compositions into a dispenser device are described, for example, in U.S. Pat. No. 5,928,611 to Leung; U.S. Pat. Nos. 5,328,687, 5,514,371, 5,514,372, 5,575,997, 5,582,834 and 5,624,669, all to Leung et al; U.S. Pat. Nos. 5,259,835 and 6,143,352 to Clark et al.; U.S. Pat. No. 3,527,841 to Wicker et al.; U.S. Pat. No. 3,722,599 to Robertson et al.; U.S. Pat. No. 3,995,641 to Kronenthal et al.; and U.S. Pat. No. 3,940,362 to Overhults; and U.S. patent application Ser. Nos. 09/099, 457, 09/430,177, and Ser. No. 09/430,289, the entire disclosures of which are incorporated herein by reference.

In embodiments, the container and its contents are sterilized. These embodiments include, but are not limited to, containers for use in medical applications. In embodiments where the container and its contents are to be sterilized, the container can be sterilized separately from the composition to be contained or the two can be sterilized together after the composition is placed in the container. It is preferable that the composition and container be sterilized together after the composition is dispensed into the container. Most preferably, the container holding the composition is sealed prior to sterilization. Sterilization can be accomplished by any of the various techniques known to the skilled artisan, and is preferably accomplished by methods including, but not limited to, physical and irradiation methods. Whatever method is chosen, it must be compatible with the composition to be sterilized and the materials used to fabricate the container.

According to the invention, it is possible to select suitable containers for the storage of 1,1-disubstituted ethylene monomer compositions that provide an increased shelf-life to the container/monomer product. Based on the above disclosure, suitable containers can be selected based on the relative required barrier properties for the monomer composition being contained. Thus, where the monomer composition exhibits a higher permeation into a polymer material used to form a container, the container polymer material can be selected so as to have a higher barrier property to the monomer composition.

Thus, based on the discoveries made by the present inventor, containers using polymer materials having higher barrier properties can be selected, for example, for higher alkyl chain length α-cyanoacrylate adhesive monomer compositions or for compositions having a lesser relative amount of stabilizer than is necessary for lower chain length α-cyanoacrylate adhesive monomer compositions or compositions having a higher relative amount of stabilizer. The polymer material of the container can thus be chosen based on other components of the monomer composition, such as the type or amount of acidic or radical stabilizer present. In contrast, however, polymer materials having lower barrier properties can be selected, for example, for lower alkyl chain length α-cyanoacrylate adhesive monomer compositions based on the length of the alkyl chain or based on the presence and quantity of other components of the composition, such as the presence of a higher amount of stabilizers. These lower barrier property polymer materials can be used, for example, because of the lesser effect on failure of the container, such as through cracking, swelling, and weakening of the container. Of course, where longer shelf-lives are desired even for these lower alkyl chain length α-cyanoacrylate adhesive monomer compositions, container polymer materials having higher barrier properties can be selected.

An additional benefit of the containers and methods of storing 1,1-disubstituted ethylene monomers provided by this invention is that a suitable shelf-life can be obtained without providing additional means for protecting the container and/or the 1,1-disubstituted ethylene monomer inside of the container. For example, many known methods and containers for storing 1,1-disubstituted ethylene monomers require that the combination of monomer and container be subjected to refrigeration. Alternatively, or in combination with refrigeration, some known methods and containers include providing an external moisture barrier surrounding the container. Such barriers include, for example, moisture barrier bags, in which the combination of monomer and container are stored. Moisture barriers are well known in the art, and can include polymeric films, such as polyethylene terephthalate (PET), and metallized polymeric films. By eliminating the necessity of the above-described components, costs are reduced and the product can be presented in a manner that is more pleasing and convenient to consumers.

Although the invention has been described with respect to particular embodiments of the invention in terms of containers comprising preferred polymeric resin materials, the invention is not limited to such embodiments, and encompasses other polymeric materials that provide the properties described herein.

EXAMPLE

Formulations comprising 2-octyl cyanoacrylate are deposited into three different types of containers. The first type of container is a high density polyethylene bottle that does not contain zinc stearate. The second type of container is a fluorinated high density polyethylene bottle that contains zinc stearate. The third type of container is a fluorinated high density polyethylene bottle that does not contain zinc stearate. A portion of the bottles containing formulation are sterilized by exposure to electron beam radiation. The bottles are randomly placed in polypropylene bins. The bins are placed in either an oven set to an elevated temperature or an environmental chamber set to a temperature of 40° C. and a relative humidity of 75%. The formulations are periodically tested for viscosity.

FIG. 1 illustrates the viscosity of the non-sterilized formulations as a function of time for the zinc stearate-containing fluorinated high density polyethylene bottles and for the zinc stearate-free fluorinated high density polyethylene bottles at an elevated temperature in a dry environment. The results show that the non-zinc stearate fluorinated bottle is slightly less stable than the zinc stearate containing fluorinated bottle.

Figure 2:
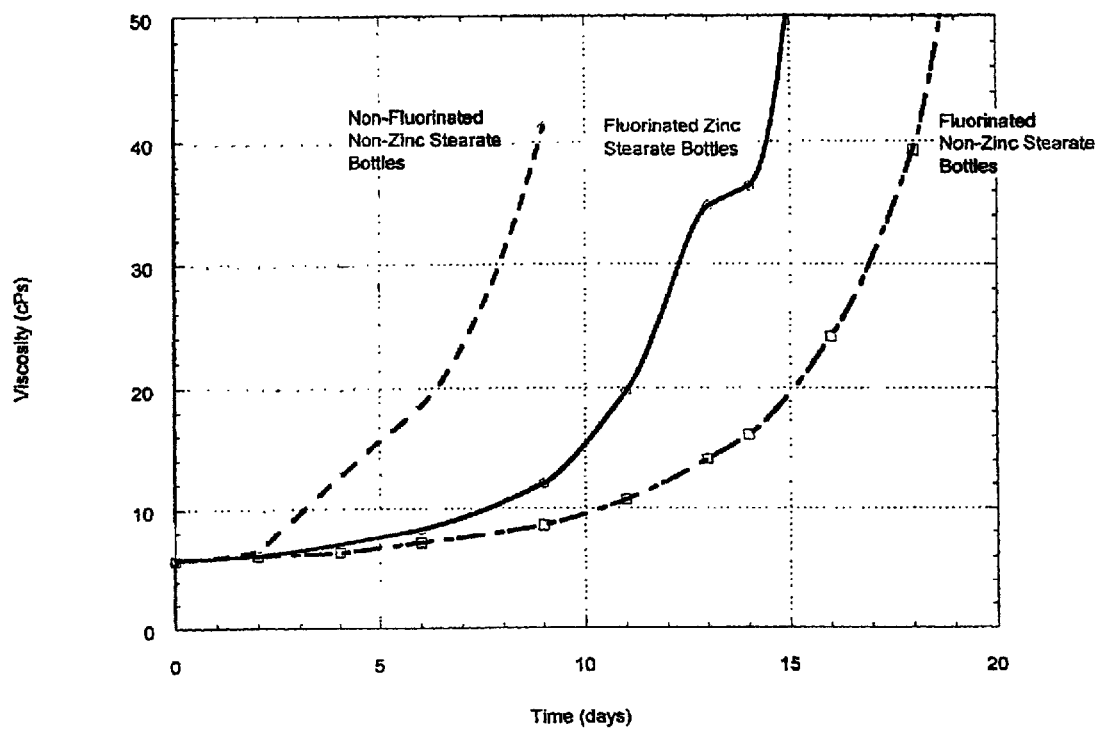
FIG. 2 is a graph showing the viscosity of the sterilized formulations of 1,1-disubstituted ethylene monomer as a function of time for zinc stearate-free high density polyethylene bottles, zinc stearate-containing fluorinated high density polyethylene bottles and zinc stearate-free fluorinated high density polyethylene bottles at elevated temperatures in a dry environment.

FIG. 2 illustrates the viscosity of the sterilized formulations as a function of time for the zinc stearate-free high density polyethylene bottles, the zinc stearate-containing fluorinated high density polyethylene bottles and for the zinc stearate-free fluorinated high density polyethylene bottles at an elevated temperature in a dry environment. The results show that non-fluorinated, non-zinc stearate containing bottles have the least stability, and that fluorinated non-zinc stearate bottles have the best stability, roughly 25% greater than the fluorinated zinc stearate containing bottles.

Figure 3:
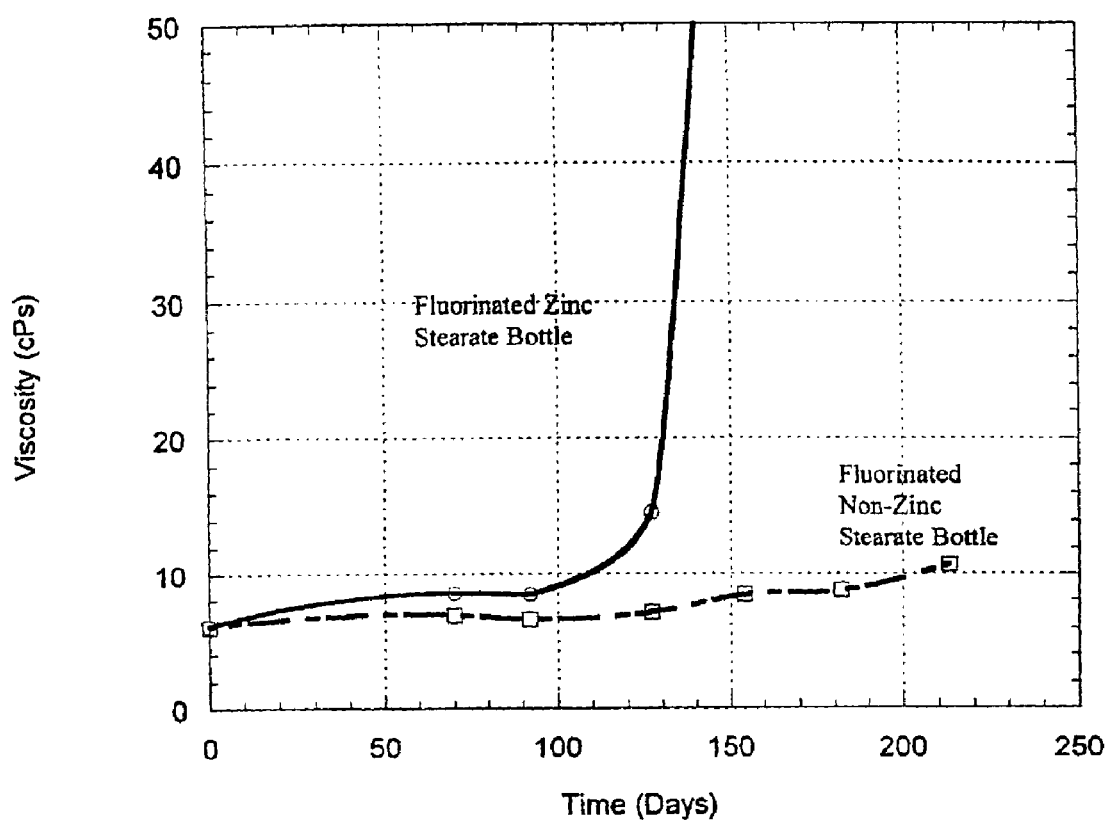
FIG. 3 is a graph showing the viscosity of the non-sterilized formulations of 1,1-disubstituted ethylene monomer as a function of time for zinc stearate-containing fluorinated high density polyethylene bottles and zinc stearate-free fluorinated high density polyethylene bottles at 40° C. with a relative humidity of 75%.

FIG. 3 illustrates the viscosity of the non-sterilized formulations as a function of time for the zinc stearate-containing fluorinated high density polyethylene bottles and for the zinc stearate-free fluorinated high density polyethylene bottles at 40° C. with a relative humidity of 75%. The results indicate that the non-zinc stearate fluorinated bottle imparts improved stability to the formulation. Stability of formulations in non-zinc stearate fluorinated bottles is approximately 100% greater than the zinc stearate-containing fluorinated bottle. An unexpected result is achieved in view of FIG. 1.

Figure 4:
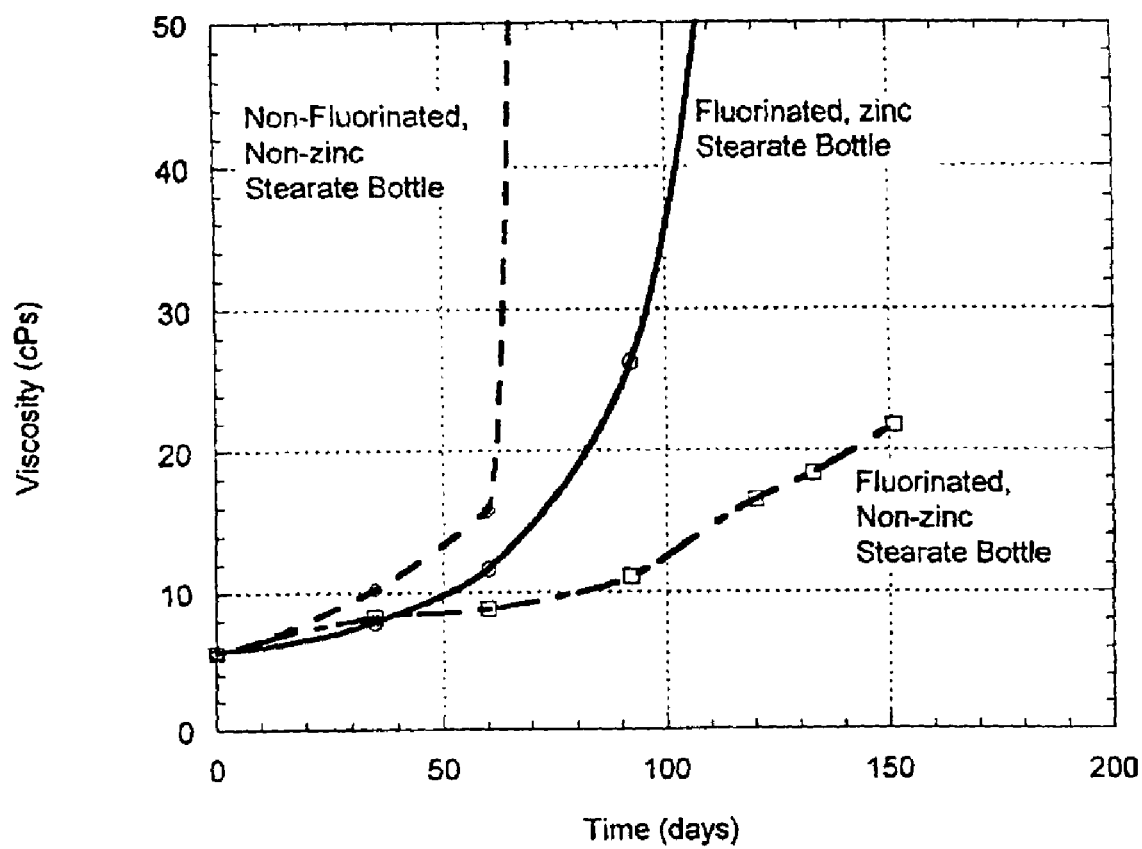
FIG. 4 is a graph showing the viscosity of the sterilized formulations of 1,1-disubstituted ethylene monomer as a function of time for zinc stearate-free high density polyethylene bottles, zinc stearate-containing fluorinated high density polyethylene bottles and zinc stearate-free fluorinated high density polyethylene bottles at 40° C. with a relative humidity of 75%.

FIG. 4 illustrates the viscosity of the sterilized formulations as a function of time for the zinc stearate-free high density polyethylene bottles, the zinc stearate-containing fluorinated high density polyethylene bottles and for the zinc stearate-free fluorinated high density polyethylene bottles at 40° C. with a relative humidity of 75%. The results show a 65% apparent increase in product stability when the formulations are placed into fluorinated, non-zinc stearate bottles instead of zinc-stearate containing bottles.

Thus, a formulation placed into fluorinated high density polyethylene bottles manufactured without zinc stearate has increased stability. This is true for both irradiation sterilized and non-sterile products. The benefit of the use of fluorinated bottles manufactured without zinc stearate is only apparent in environments having high humidity. These types of environments resemble ambient conditions. Thus, the containers of the present invention provide a greatly extended shelf life for 1,1-disubstituted ethylene monomer compositions.

What is claimed is:

1. A combination including:
    a container comprising a polymeric resin matrix including at least one halogenated polymeric material, the container being free from mold release agent; and
    a 1,1-disubstituted ethylene monomer composition contained in said container.

2. The combination of claim 1, wherein said halogenated polymeric material is a post-halogenated polymeric material.

3. The combination of claim 1, wherein said polymeric material is high-density polyethylene.

4. The combination of claim 1, wherein said mold release agent is zinc stearate.

5. The combination of claim 1, wherein said container is sterilized.

6. The combination of claim 1, wherein said container is sterilized using electron beam radiation.

7. The combination of claim 1, wherein said 1,1-disubstituted ethylene monomer composition comprises an alkyl α-cyanoacrylate adhesive monomer having an alkyl carbon length of at least six carbons.

8. The combination of claim 7, wherein said alkyl α-cyanoacrylate adhesive monomer is 2-octyl cyanoacrylate.

9. The combination of claim 1, wherein said halogenated polymeric material is a post-fluorinated polymeric material.

10. A combination including;
    a container comprising a polymeric resin matrix including at least one halogenated polymeric material, the container being free from zinc stearate; and
    a 1,1-disubstituted ethylene monomer composition contained in said container.

11. The combination of claim 10, wherein said halogenated polymeric material is a post-halogenated polymeric material.

12. The combination of claim 10, wherein said halogenated polymeric material is present on at least an interior surface of said container.

13. The combination of claim 10, wherein said halogenated polymeric material is in direct contact with said 1,1-disubstituted ethylene monomer composition.

14. The combination of claim 10, wherein said polymeric material is selected from the group consisting of a polyolefin and an engineered resin.

15. The combination of claim 14, wherein said polymeric material is high density polyethylene.

16. The combination of claim 14, wherein said polymeric material is linear low density polyethylene.

17. The combination of claim 16, wherein said polymeric material is polyethylene terephthalate.

18. The combination of claim 10, wherein said polymeric material comprises at least one polymer selected from the group consisting of low density polyethylene, linear low density polyethylene, high density polyethylene, cross-linked high density polyethylene, polypropylene, polyethylene terephthalate, polybutylene terephthalate, and oriented polyethylene terephthalate.

19. The combination of claim 10, wherein said container is a laminate and a layer comprising said post-halogenated polymeric material is in direct contact with said 1,1-disubstituted ethylene monomer composition.

20. The combination of claim 10, wherein said combination has a shelf-life of at least about twenty-four months.

21. The combination of claim 10, wherein said combination has a shelf-life of at least about thirty months.

22. The combination of claim 10, wherein said container is sterilize.

23. The combination of claim 10, wherein said container is sterilized using electron beam radiation.

24. The combination of claim 10, wherein said 1,1-disubstituted ethylene monomer composition comprises an alkyl α-cyanoacrylate adhesive monomer having an alkyl carbon length of at least six carbons.

25. The combination of claim 24, wherein said allyl α-cyanoacrylate adhesive monomer is 2-octyl cyanoacrylate.

26. The combination of claim 25, wherein said container comprises:
a body comprising an interior and an exterior surface, wherein said body comprises a post-halogenated high density polyethylene polymer on at least said interior surface;
a dispenser nozzle comprising at least an interior surface, wherein said dispenser nozzle comprises a post-halogenated linear low density polyethylene on said interior surface, the dispenser nozzle being free from zinc stearate; and
a cap comprising post-halogenated polypropylene, the cap being free from zinc stearate.

27. The combination of claim 10, wherein said halogenated polymeric material is a post-fluorinated polymeric material.

28. The combination of claim 10, wherein said halogenated polymeric material is a post-chlorinated polymeric material.

29. The combination of claim 10, wherein said halogenated polymeric material comprises a surface region and a sub-surface region, and wherein a halogen concentration in said surface region is greater than a halogen concentration in said sub-surface region.

30. A combination including:
a container comprising a polymeric resin matrix including fluorinated high-density polyethylene, the container being free from zinc stearate; and
a 1,1-disubstituted ethylene monomer composition contained in said container;
wherein said container is sterilized using electron beam radiation.

31. A method of manufacturing a polymeric container containing a 1,1-disubstituted ethylene monomer, comprising:
providing a container comprising a halogenated polymeric material, said container comprising at least an internal surface and an external surface, the container being free from mold release agent;
dispensing a 1,1-disubstituted ethylene monomer composition into said container;
optionally sealing said container; and
optionally sterilizing said container.

32. The method of claim 31, wherein providing a container comprises providing a container that is free from zinc stearate.

33. The method of claim 31, wherein said 1,1-disubstituted ethylene monomer is an alkyl α-cyanoacrylate.

34. The method of claim 31, wherein optionally sterilizing comprises sterilizing with electron beam radiation.

35. The method of claim 31, wherein said polymeric material is high density polyethylene.

36. A method of manufacturing a polymeric container containing a 1,1-disubstituted ethylene monomer, comprising:
providing a container comprising a halogenated polymeric material, said container comprising at least an internal surface and an external surface, the container being free from zinc stearate;
dispensing a 1,1-disubstituted ethylene monomer composition into said container;
optionally sealing said container; and
optionally sterilizing said container.

37. The method of claim 36, wherein optionally sterilizing comprises sterilizing with electron beam radiation.

38. A method of manufacturing a polymeric container containing a 1,1-disubstituted ethylene monomer, comprising:
providing a container comprising a polymeric material, said container comprising at least an internal surface and an external surface, the container being free from zinc stearate;
halogenating said polymeric material on at least said internal surface of said container;
dispensing a 1,1-disubstituted ethylene monomer composition into said container;
optionally sealing said container; and
optionally sterilizing said container.

39. The method of claim 38, wherein said halogenating is performed after molding said polymeric material into a form that is to be the form of the container.

40. The method of claim 38, wherein said halogenating is performed concurrent with molding said polymeric material into a form that is to be the form of the container.

41. The method of claim 40, wherein said molding comprises blow-molding a parison using a halogen-containing gas, and said halogen-containing gas also performs said halogenating.

42. The method of claim 41, wherein residual halogen-containing species from said molding remain captured or dissolved in said container and are not removed from said container prior to said dispensing.

43. The method of claim 38, wherein said 1,1-disubstituted ethylene monomer is an alkyl α-cyanoacrylate.

44. The method of claim 38, wherein said container is sterilized with electron beam radiation.

45. The method of claim 38, wherein said halogenating comprises fluorinating said polymeric material on at least said internal surface of said container.

46. The method of claim 38, wherein said halogenating comprises chlorinating said polymeric material on at least said internal surface of said container.

47. The method of claim 38, wherein said polymeric material is selected from the group consisting of low density polyethylene, linear low density polyethylene, high density polyethylene, cross-linked high density polyethylene, polypropylene, polyethylene terephthalate, polybutylene terephthalate, and oriented polyethylene terephthalate.

48. A method of manufacturing a polymeric container containing a 1,1-disubstituted ethylene monomer, comprising:
providing a container comprising fluorinated high-density polyethylene, said container comprising at least an internal surface and an external surface, the container being free from zinc stearate;

dispensing a 1,1-disubstituted ethylene monomer composition into said container;

sealing said container; and sterilizing said container with electron beam radiation.

49. A method of storing a 1,1-disubstituted ethylene monomer composition in a container comprising:

providing a container comprising a polymeric resin matrix including at least one halogenated polymeric material, the container being free from zinc stearate;

dispensing a 1,1-disubstituted ethylene monomer composition into said container;

optionally sterilizing said container; and storing said monomer-containing container for more than one year without failure of the container or monomer composition.

50. The method of claim 49, wherein said storing of said monomer-containing container is for more than twenty-four months without failure of the container or monomer composition.

51. The method of claim 49, wherein said storing of said monomer-containing container is for more than thirty months without failure of the container or monomer composition.

52. The method of claim 49, wherein said storing is under conditions of room temperature and a relative humidity of from about 40 to about 60%.

53. The method of claim 49, wherein said 1,1-disubstituted ethylene monomer composition comprises an alkyl α-cyanoacrylate monomer.

54. The method of claim 49, wherein said container is made by a process comprising:

providing a container comprising a polymeric material, said container comprising at least an internal surface and an external surface, and halogenating said polymeric material on at least said internal surface of said container.

55. The method of claim 49, further comprising sealing said container prior to said storing step.

56. The method of claim 49, wherein optionally sterilizing comprises sterilizing with electron beam radiation.

57. The method of claim 49, wherein said container is not enclosed in an external moisture barrier.

58. The method of claim 49, wherein said container is not subjected to refrigeration.

* * * * *